(12) United States Patent
Kuwahara (10) Patent No.: US 6,209,688 B1
(45) Date of Patent: Apr. 3, 2001

(54) EDDY CURRENT REDUCTION APPARATUS

(75) Inventor: Tohru Kuwahara, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/409,575

(22) Filed: Sep. 30, 1999

(30) Foreign Application Priority Data

Sep. 30, 1998 (JP) .................................................. 10-277329

(51) Int. Cl.[7] .................................................. B60L 7/00
(52) U.S. Cl. .................. 188/156; 188/164; 188/158; 188/267
(58) Field of Search .................. 188/164, 158, 188/159, 160, 161, 162, 163, 267

(56) References Cited

U.S. PATENT DOCUMENTS

| | | | |
|---|---|---|---|
| 2,525,571 | * 10/1950 | Winther | 192/84 |
| 3,488,535 | * 1/1970 | Baermann | 310/93 |
| 3,601,641 | * 8/1971 | Baermann | 310/93 |
| 4,146,805 | * 3/1979 | Fehr et al. | 310/104 |
| 4,937,483 | * 6/1990 | Matsui et al. | 310/105 |
| 5,054,587 | * 10/1991 | Matsui et al. | 188/267 |
| 5,303,802 | * 4/1994 | Kuwahara | 188/158 |
| 5,337,862 | * 8/1994 | Kuwahara | 188/158 |
| 6,041,897 | * 3/2000 | Saumweber et al. | 188/165 |

FOREIGN PATENT DOCUMENTS

| | | |
|---|---|---|
| 6-38504 | 2/1994 | (JP) . |
| 6-38505 | 2/1994 | (JP) . |

\* cited by examiner

*Primary Examiner*—Matthew C. Graham
*Assistant Examiner*—Benjamin A Pezzlo
(74) *Attorney, Agent, or Firm*—John E. Toupal; Harold G. Jarcho

(57) ABSTRACT

An eddy current reduction braking system in which with high speed rotation of a brake drum, magnetic flux produced by magnets is concentrated to increase magnetic flux density and thereby enhance braking force. According to the invention, there is provided a guide tube formed of a non-magnetic material and having a hollow portion in the shape of a rectangle in section disposed interiorly of a brake drum. A number of ferromagnetic pole pieces are disposed at annularly equal intervals on an outer surface of the guide tube and at least one magnet support tube is movably mounted in the hollow portion of the guide tube. Magnets are mounted on the magnet support tube such that their polarities with respect to the ferromagnetic pole pieces are alternately different.

18 Claims, 8 Drawing Sheets

EDDY CURRENT REDUCTION APPARATUS

BACKGROUND OF THE INVENTION

The present invention relates generally to an eddy currect reduction brake apparatus for large sized vehicles or the like, and, more particularly, to an eddy current reduction brake apparatus in which magnetic flux of a permanent magnet is effectively applied to a brake drum.

In conventional eddy current reduction braking systems, ferromagnetic plates have substantially rectangular cross sections and outer and inner surfaces of substantially the same area. Consequently, magnetic flux from the magnets is not concentrated by the ferromagnetic plates onto a brake drum. If the ferromagnetic plates are shaped as trapezoids, and the area of outer surfaces made narrower than the areas of inner surfaces, it is possible to concentrate the magnetic flux entering the brake drum and thereby increase magnetic flux density and enhance brake force. However, in the aforementioned construction, the edge effect concentration of magnetic flux is difficult to obtain, and it is difficult to cast the ferromagnetic plates into an outer tubular portion of a guide tube made of aluminum. Furthermore, even if the guide tube is manufactured by forging, allowance for machining of the outer and inner peripheral surfaces of the outer tubular portion increases and the volume of the ferromagnetic plates decreases because of a resultant parting line. In eddy current reduction braking systems having an immovable magnet support tube and a movable magnet support tube axially arranged in a hollow portion of a guide tube, a non-braking condition produces on the brake drum a dragging torque. Therefore, it is necessary to thicken the ferromagnetic plates and increase the volume in order to suppress the dragging torque, which is dis-advantageous in terms of braking performance.

In eddy current reduction braking systems in which a good conductor such as copper is coated or deposited on the opposite ends of a brake drum, brake force can be enhanced by ferromagnetic plates of rectangular shape and without roundness at corner portions. However, the entire periphery of the sides of the ferromagnetic plates have to be machined and a parting line eliminated by machining. Thus, even if the ferromagnetic plates are cast into a guide tube made of aluminum, the ferromagnetic plates are attracted by the brake drum such that the ferromagnetic plates can possibly move out of the guide tube. Furthermore, the guide tube contracts substantially during a cooling period after ferromagnetic plates have been cast, and cracks possibly occur in portions adjacent to corner portions of the ferromagnetic plates in the guide tube.

In the conventional eddy current reduction braking systems disclosed in Japanese Patent Laid-Open Nos. 6-38504 and 6-38505 publications or the like, side sections of ferromagnetic plates are shaped such that an outer surface of a rear portion protrudes rearwardly in a rotational direction of a brake drum, and a rear surface is inclined in a direction opposite to the rotational direction of the brake drum. The above-described construction is intended to disperse magnetic flux from the magnets to the brake drum to enhance the braking performance. However, it has been found that at the high speed rotation of the brake drum, the magnetic flux exerted on the brake drum is concentrated, rather than being dispersed, so as to enhance the edge effect of the ferromagnetic plates, and contribute to an increase in braking force.

SUMMARY OF THE INVENTION

The present invention is an eddy current reduction braking system in which with high speed rotation of a brake drum, magnetic flux produced by magnets is concentrated to increase magnetic flux density and thereby enhance braking force. According to the invention, there is provided a guide tube formed of a non-magnetic material and having a hollow portion in the shape of a rectangle in section disposed interiorly of a brake drum. A number of ferromagnetic pole pieces are disposed at annularly equal intervals on an outer surface of the guide tube and at least one magnet support tube is movably mounted in the hollow portion of the guide tube. Magnets are mounted on the magnet support tube such that their polarities with respect to the ferromagnetic pole pieces are alternately different. In addition, each pole piece has an outer surface of area less than that of an inner surface thereof, and the inner surface includes a portion circumferentially displaced from the outer pole piece surface in a direction opposite to a given direction of brake drum rotation.

Preferably, a side section of each ferromagnetic pole piece is made similar to a parallelogram. This provides a desired flux concentration edge effect in a front portion facing the rotational direction of a brake drum without a requirement for excessive machining of the ferromagnetic pole pieces prior to casting. Because of the shape of the pole pieces, magnetic flux reaching the brake drum from the magnets is concentrated at the front end portions in the given direction of brake drum rotation. Preferably, the front surface of each ferromagnetic pole piece is inclined in the given rotational direction from the inner surface toward the outer surface of the pole piece, and the thickness of the rear half portion of each ferromagnetic pole pieces is gradually reduced in a direction opposite to the given rotational direction. For example, the rear surface of each ferromagnetic pole piece can be inclined from the inner pole piece surface toward the outer pole piece surface. However, when the thickness of the rear portion of the ferromagnetic pole piece is too thin, the passing of magnetic flux is weakened, and the magnetic flux leaks outside when in a non-braking condition. It is therefore preferable that the thickness of the rear portion of the ferromagnetic plates is made thinner stepwise or in a stepwise manner to prevent a leakage of magnetic flux when in the non-braking condition.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
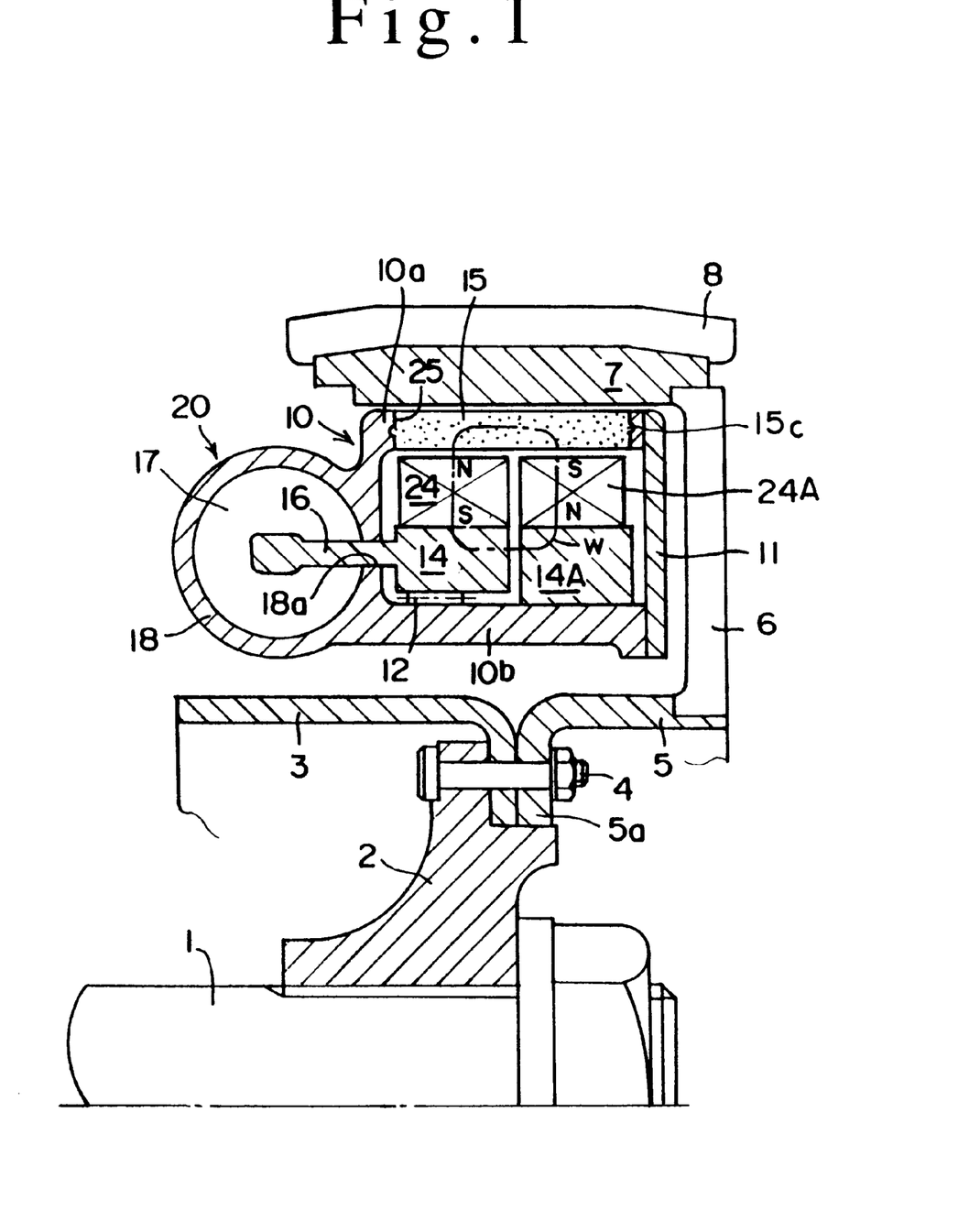
FIG. 1 is a front sectional view showing a non-braking state of an eddy current reduction apparatus to which the present invention is applied.

As shown in FIG. 1, the braking system according to the present invention includes a brake drum 7 formed of a conductor and connected to an output rotational shaft 1 of, for example, a speed change gear for a vehicle; a guide tube 10 formed of a non-magnetic material disposed within the brake drum 7; and a movable magnet support tube 14 and an immovable magnet support tube 14A each retained in a hollow rectangular portion in section of the guide tube 10. The brake drum 7 has a flange portion 5a on a boss 5 and joined by bolts 4 with an end wall portion of a brake drum 3 of a parking brake on a mounting flange 2 spline-fitted and secured to a rotational shaft 1. One end of the brake drum 7 provided with cooling fins 8 connected to a number of spokes 6 extending radially from the boss 5.

The guide tube 10 of rectangular shape in section is constituted by connecting, for example, an end wall 11 formed from an annular plate to a tubular body having a C shape in section. The guide tube 10 is secured to a gear box of, for example, a speed change gear by suitable means (not shown). An outer support tube portion 10a of the guide tube 10 is provided with a number of slots 25 at circumferentially equal intervals, and a ferromagnetic pole piece 15 is fitted and retained within each slot 25. Preferably, ferromagnetic pole pieces 15 are cast when the guide tube 10 is molded. Strictly speaking, in terms of strength, only the outer tubular support portion 10a of the guide tube must be formed of a non-magnetic material.

The movable magnet support tube 14 of an axial dimension about a half of the hollow portion of the guide tube 10, is formed of a magnetic material and is disposed in the hollow portion of the guide tube 10. Specifically, the movable magnet support tube 14 is supported for reciprocal rotation on an inner tubular portion 10b by a slide or roller bearing 12. An arm 16 extends axially and outwardly from the magnet support tube 14 via a circular slit 18a provided in the end wall of the guide tube 10 and is connected to a rod of an actuator 20. The magnet support tube 14 has magnets 24 which are opposed to a left half of each ferromagnetic pole piece 15 and connected to the outer peripheral surface of the magnet support tube 14 so that polarities with respect to the ferromagnetic plate 15 are alternately different.

The immovable magnet support tube 14A formed of a magnetic material also and has the same number of magnets 24A as that of the magnets 24, and the magnets 24A are arranged at peripherally equal intervals similar to the magnets 24. Connecting the magnet support tube 14A to the inner tubular portion 10b of the guide tube 10 is any suitable means (not shown). It is noted, however, that the magnet support tube 14A can be connected to the outer tubular portion 10a of the guide tube 10. An actuator 20 connected to a left end wall of the guide tube 10 and includes a cylinder 18 with a piston 17 fitted therein, and a rod projecting outside from the piston 17 is conencted to an arm 16.

Figure 2:
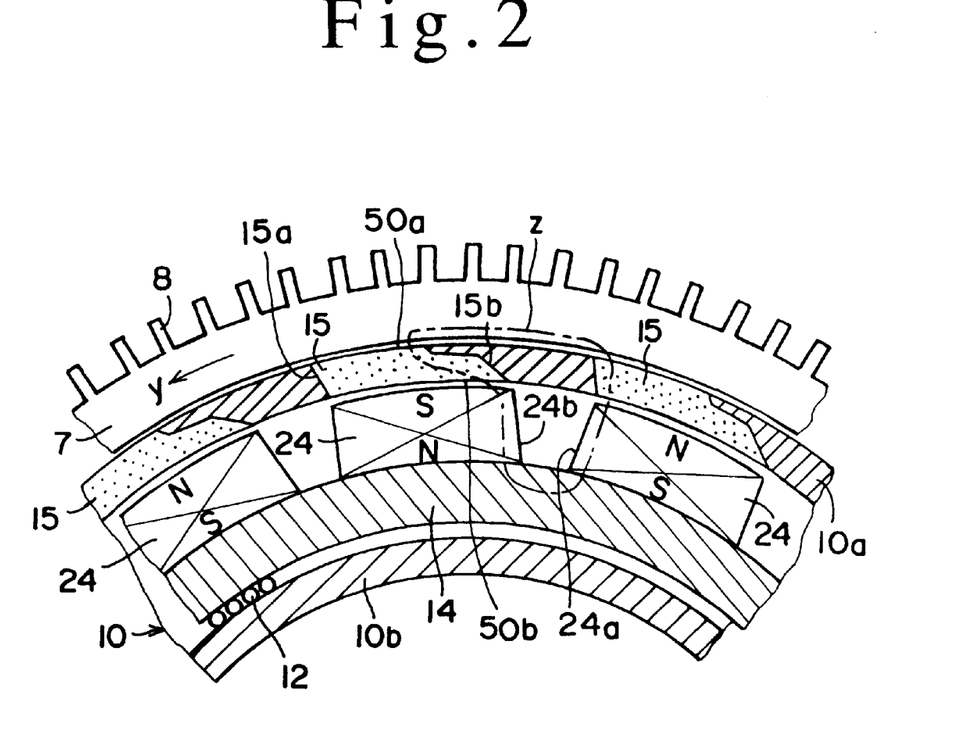
FIG. 2 is a side sectional view showing a braking state of the eddy current reduction apparatus.

As shown in FIG. 2, each ferromagnetic pole piece 15 includes an outer pole piece surface 50a of area less than that of an inner pole piece surface 50b covering an outer surface of a magnet 24. Also each pole piece 15 includes a front surface 15a, a rear surface 15b, and side surfaces 50c (see FIG. 4) parallel with each other. The front surface 15a is tapered brake drum 7 from the inner surface 50b toward the outer surface 50a in a given direction y of brake drum rotation.

Figure 3:
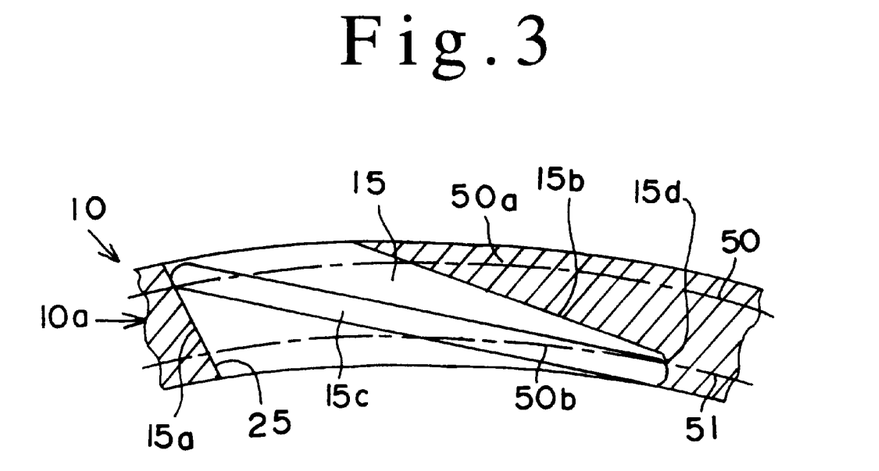
FIG. 3 is a side sectional view showing the connecting structure of the ferromagnetic plates with respect to an outer tubular portion of a guide tube in the eddy current reduction apparatus.
Figure 4:
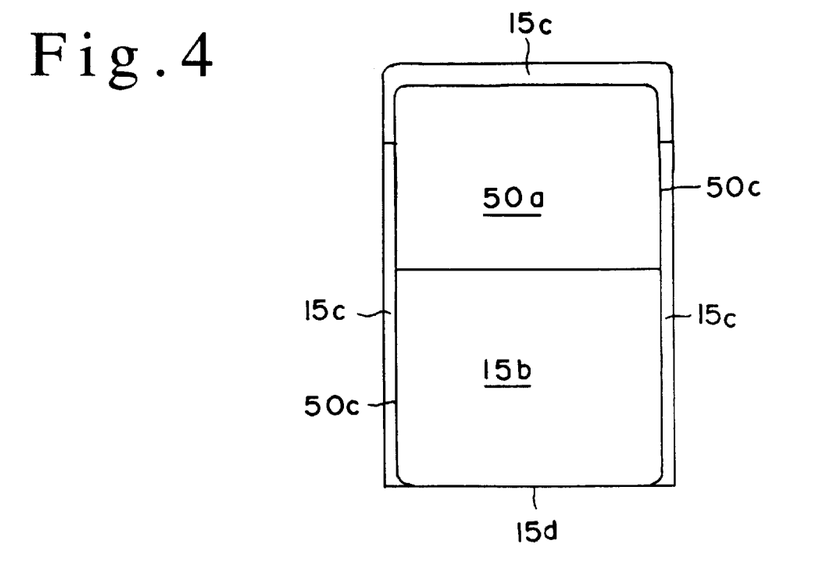
FIG. 4 is a plan view showing the connecting structure of the ferromagnetic plate.

As shown in FIGS. 3 and 4, each ferromagnetic pole piece 15 is formed in advance by forging, with a parting line 15c surrounding the entire circumference and inclined with respect to the pole piece surface and subsequently is cast in the outer tubular portion 10a of the guide tube 10. After the guide tube 10 has been cast, an outer pole piece surface 50 and inner pole piece surface 51 and the outer tubular portion 10a of the guide tube 10 are finished into cylindrical surfaces by machining, as shown by chain lines in FIG. 3. By this feature, a front end portion and a rear end portion of the parting line 15c are substantially removed, but both side portions of the parting line 15c remain on both side surfaces 50c to obtain a strong connection between the outer tubular portion 10a and the ferromagnetic pole piece 15.

Each pole piece 15 has an outer pole piece surface 50a facing an inner peripheral surface of the brake drum 7 and having an area less than that of an inner pole piece surface 50b facing the magnets 24 and 24a. Consequently, magnetic flux density directed from the magnets 24 and 24A toward the brake drum 15 is maximum in the front end portion of the ferromagnetic pole piece 15 facing in the rotational direction y of the brake drum 7. Furthermore, the front and rear surfaces 15a and 15b of each pole piece 15 are tapered forward in the rotational direction y of the brake drum 7 so that the magnetic flux from the magnets 24 and 24A is concentrated in the front end portion of each pole piece 15. Thus, each of the ferromagnetic pole pieces 15 has a side section in the general shape of a parallelogram and providing an inner pole piece surface 50b with a portion corresponding to the tapered surface 15b which is circumferentially displaced from the outer surface 50a in a direction opposite to the rotational direction y. Both the side surfaces 50c of the ferromagnetic plate 14 are formed into planes which are parallel with each other and perpendicular to the rotational shaft 1 of the brake drum 7.

Figure 5:
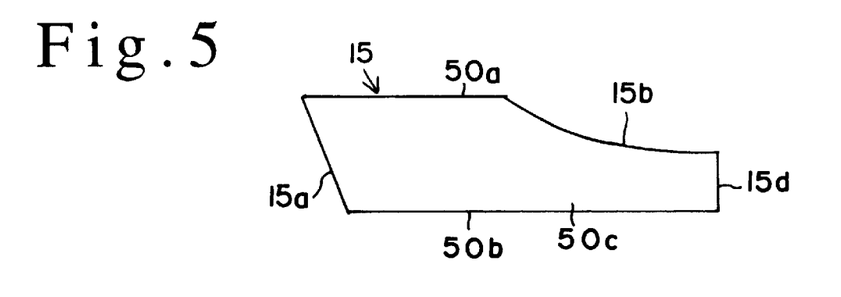
FIG. 5 is a side view of another ferromagnetic plate.

While in the embodiments shown in FIGS. 1 to 4, there is shown a simple construction in which the rear surface 15b of each pole piece 15 is tapered in the rotational direction y of the brake drum 7. It is to be noted, however, that the desired displacement between the outer surface 50a of the pole piece 15 from a portion of its inner surface 59b need not necessarily be a simple tapered surface but also can be formed into a concave rear surface portion 15b such that the thickness of the pole piece 15 becomes gradually less in the direction opposite to the rotational direction of the brake drum 7, as shown in FIG. 5. Further, the pole piece 15 can be provided with another rear surface portion 15d perpendicular to the inner surface 50b. In that way the rear surface portion 15d and the inner surface 50b do not form an acute angle and can facilitate a close connection with the outer tubular portion 10a. While the rear surface portion 15d is constituted to be a surface extending diametrically outward from the diametrically central part of the brake drum 7 in the embodiment shown in FIG. 5, it is to be noted that if the rear surface portion 15d is tapered from the inner surface 50b opposite to the rotational direction of the brake drum 7 to intersect a rear surface portion 15b tapered forward in a rotational direction of the brake drum 7 as shown in FIG. 7, a closer connection with the outer tubular portion 10a of the guide tube 10 can be obtained.

Figure 6:
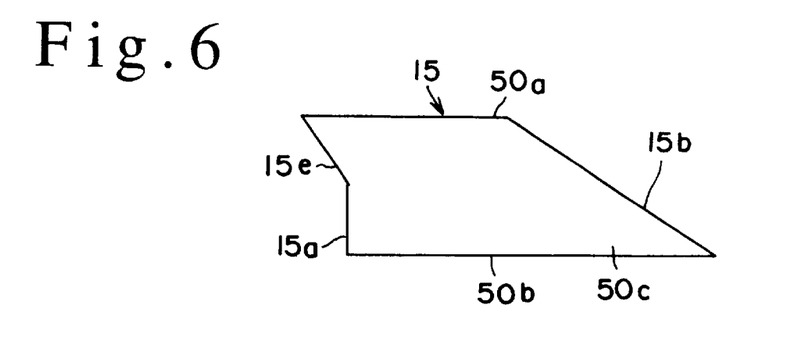
FIG. 6 is a side view of a further ferromagnetic plate.
Figure 7:
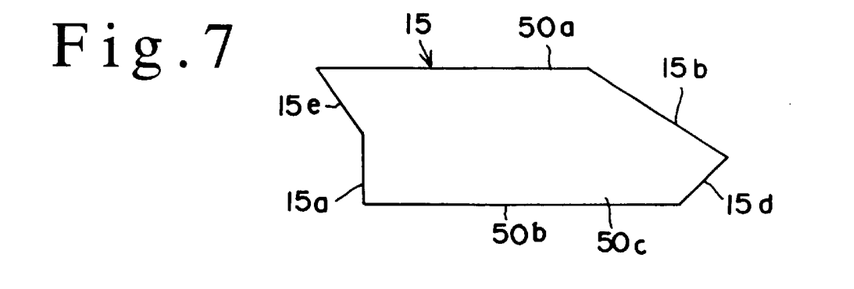
FIG. 7 is a side view of another ferromagnetic plate.
Figure 8:
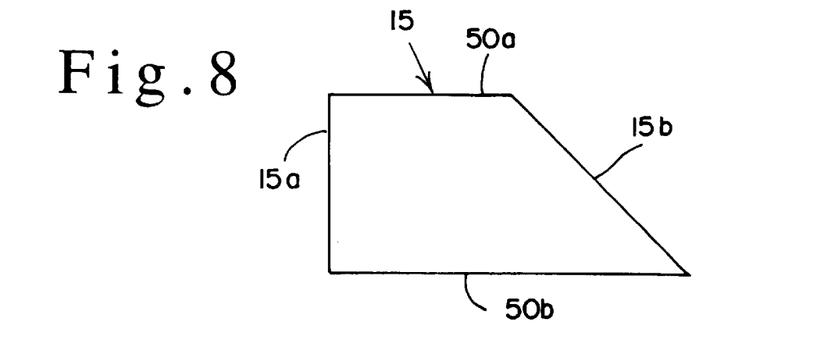
FIG. 8 is a side view of still another ferromagnetic plate.

In the embodiments shown in FIGS. 6 and 7, the front surface of the pole piece 15 is composed of a front surface portion 15a substantially perpendicular to the inner surface 50b, and a front surface portion 15e tapered forward in the rotational direction of the brake drum 7. Consequently, magnetic flux from the magnet 24 is concentrated where the outer surface 50a and the front surface portion 15e intersect. By this configuration, the magnetic flux from the magnet 24 is directed toward the front end portion of the ferromagnetic plate 15 so that magnetic flux density becomes large to generate a stronger eddy current within the brake drum 7, thus enabling enhancement of the braking ability. Furthermore, for facilitating that result, the rear surface can be formed into the tapered shape as the rear surface 15b or a combination of the rear surface portion 15b and the rear surface 15d shown in FIGS. 5 to 7, and the front surface 15a made to be perpendicular to the inner surface 50b, as shown in FIG. 8.

Figure 9:
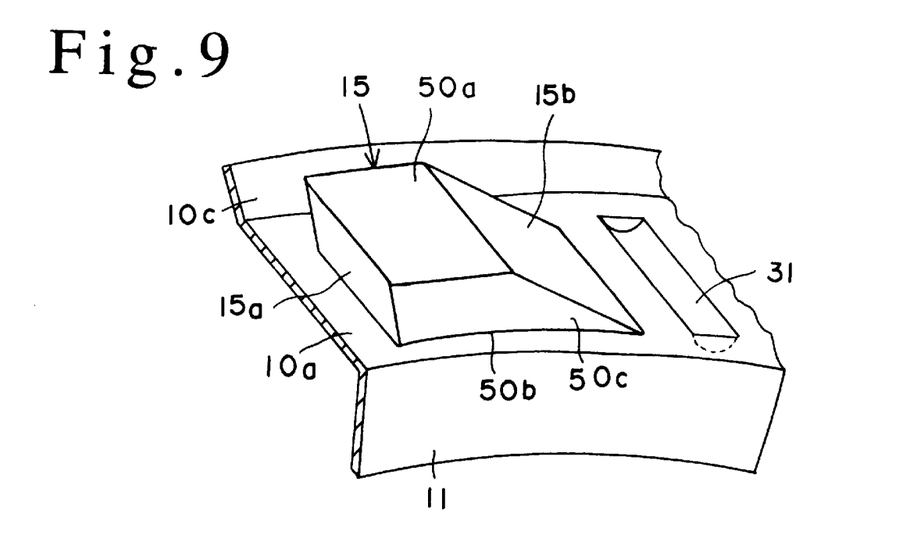
FIG. 9 is a perspective view showing the connecting structure of the ferromagnetic plate with respect to an outer tubular portion of a guide tube formed from a thin stainless steel plate.
Figure 10:
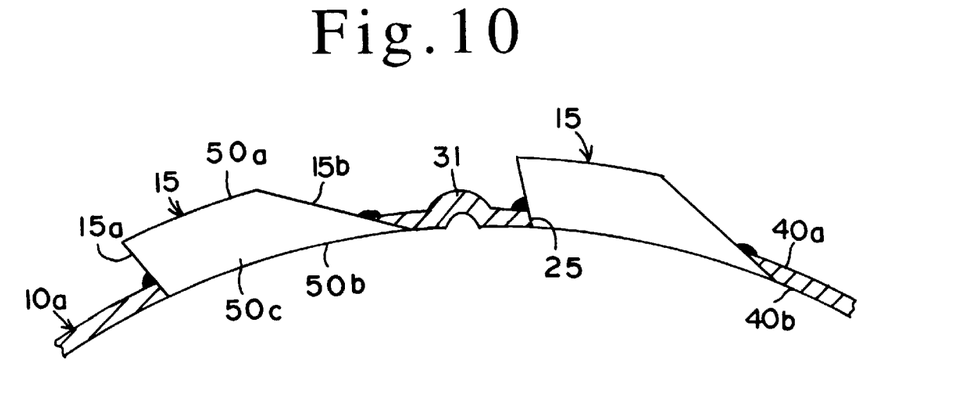
FIG. 10 is a side sectional view showing the connecting structure of the ferromagnetic plates with respect to the outer tubular portion.

While in the foregoing, a description has been made of an embodiment in which the ferromagnetic pole piece 15 is cast into the outer tubular portion 10a of the hollow guide tube 10 formed of aluminum, it is to be noted that in the embodiments shown in FIGS. 9 to 12, the outer tubular portion 10a of the guide tube 10 can be formed from a thin stainless steel plate. The ferromagnetic pole piece 15 is fitted into a slot 25 provided in the outer tubular portion 10a and connected thereto by welding or the like. Preferably, the outer tubular portion 10a is formed with an axially extending groove-shaped reinforcing rib 31 between each pair of slots 25. Alternately, as shown in FIG. 10, the reinforcing rib 31 can be extended radially and outwardly from an outer peripheral surface 40a of the outer tubular portion 10a.

Figure 11:
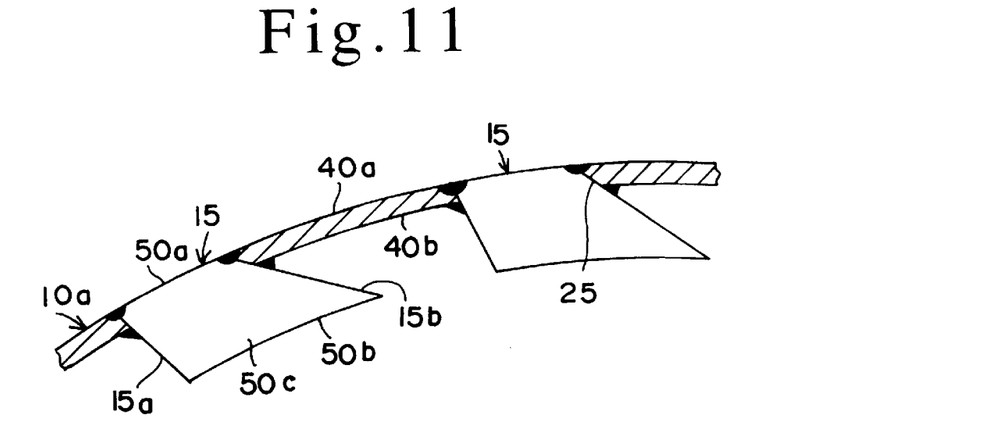
FIG. 11 is a side sectional view showing another connecting structure of the ferromagnetic plates with respect to the outer tubular portion.
Figure 12:
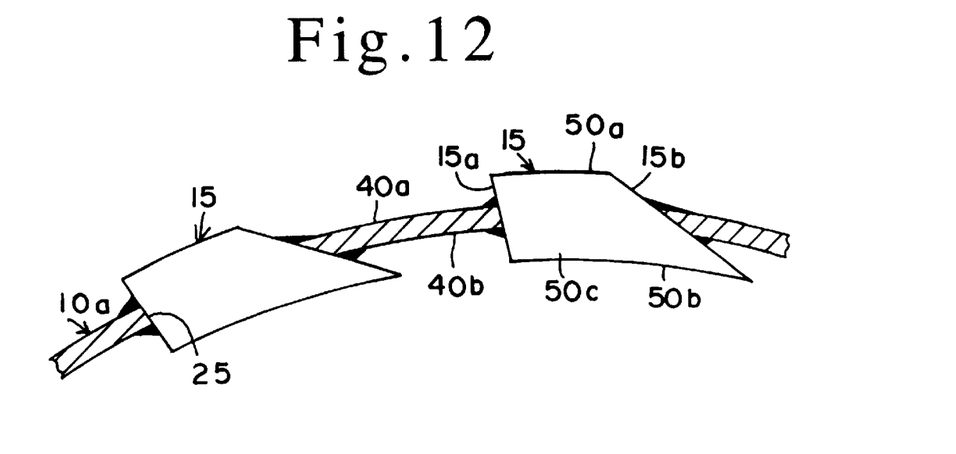
FIG. 12 is a side sectional view showing another connecting structure of the ferromagnetic plates with respect to the outer tubular portion.

The ferromagnetic pole piece 15 can be connected such that its inner surface 50b is aligned with an inner peripheral surface 40b of the outer tubular portion 10a and its outer surface 5a projects outwardly from the outer surface 40a of the tube 10a as shown in FIGS. 9 and 10. Alternatively, the pole piece 15 can be connected so that its outer surface 50a is aligned with the outer surface 40a of the tubular portion 10a and its inner surface 50b projects outwardly from the inner surface 40b of the tube 10a as shown in FIG. 11. Furthermore, the ferromagnetic pole piece 15 can be fitted and welded into intermediate portion wherein its outer surface 50a projects outwardly from the outer surface 40a and its inner surface 50b projects outwardly from the inner surface of the outer tubular portion 10a, as shown in FIG. 12.

When in a non-braking condition, the polarities of the magnets 24 and 24A fully opposed to adjacent ferromagnetic pole pieces 15 are reversed to each other, as shown in FIG. 1. At that time, the magnets 24 and 24A form short-circuited magnetic circuits w between the ferromagnetic plate 15 and the magnet support tubes 14 and 14A and apply no magnetic field to the brake drum 7.

When in a braking condition, the magnets 24 and 24A aligned in an axial direction and opposed to adjacent ferromagnetic pole pieces 15 are the same in polarities, as shown in FIG. 2. Magnetic fields then are applied to the brake drum 7 via the pole pieces 15. When the rotating brake drum 7 crosses magnetic fields, eddy currents flow into the brake drum 7, and the brake drum 7 receives the brake torque. At that time, the magnets 24 and 24A form magnetic circuits z between the brake drum 7 and the magnet support tubes 14 and 14A.

In the embodiment shown in FIGS. 1 and 2, the movable magnet support tube 14 is reversibly rotated by a hydraulic actuator 20 and switched to a braking position in which the magnets 24 and 24A of the same polarities are wholly opposed to the common ferromagnetic pole pieces 15 and to a non-braking position in which the magnets 24 and 24A of the different polarities are wholly opposed to the common ferromagnetic pole pieces 15. However, the present invention is not limited to the above described eddy current reduction apparatus and can be also applied to other types of eddy current reduction braking systems.

Figure 13:
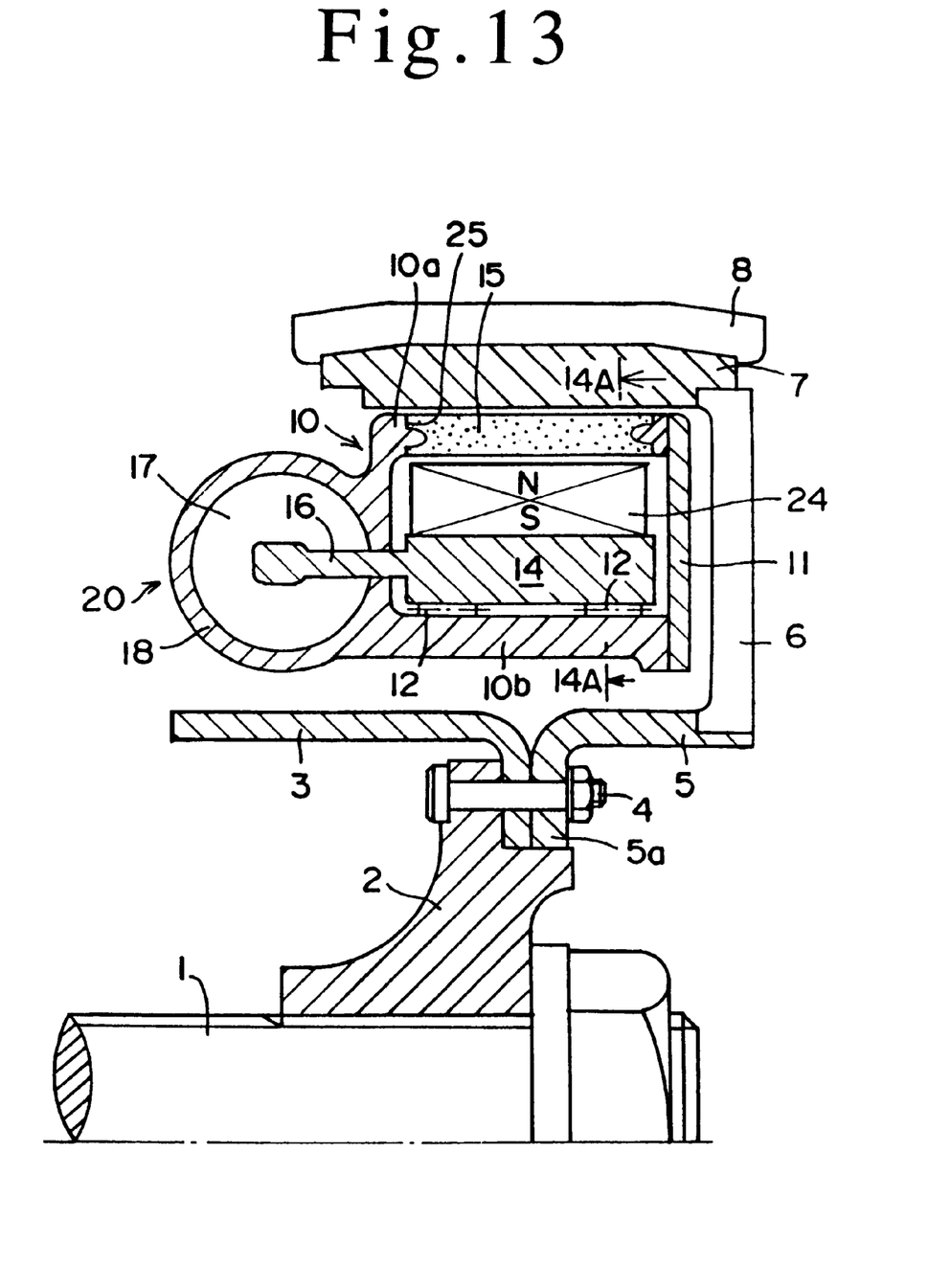
FIG. 13 is a front sectional view of a further eddy current reduction apparatus to which the present invention is applied.
Figure 14:
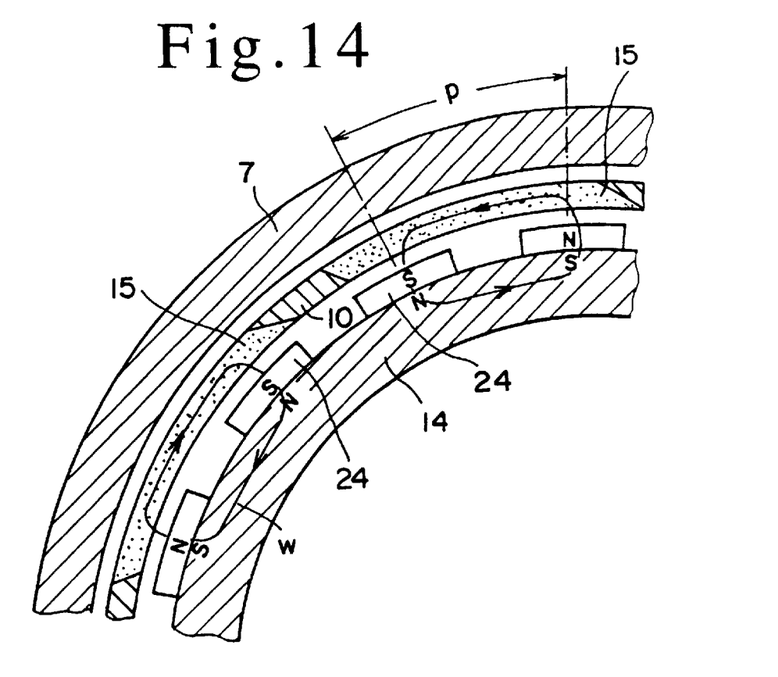
FIG. 14 is a side sectional view showing a non-braking state of the eddy current reduction apparatus.
Figure 15:
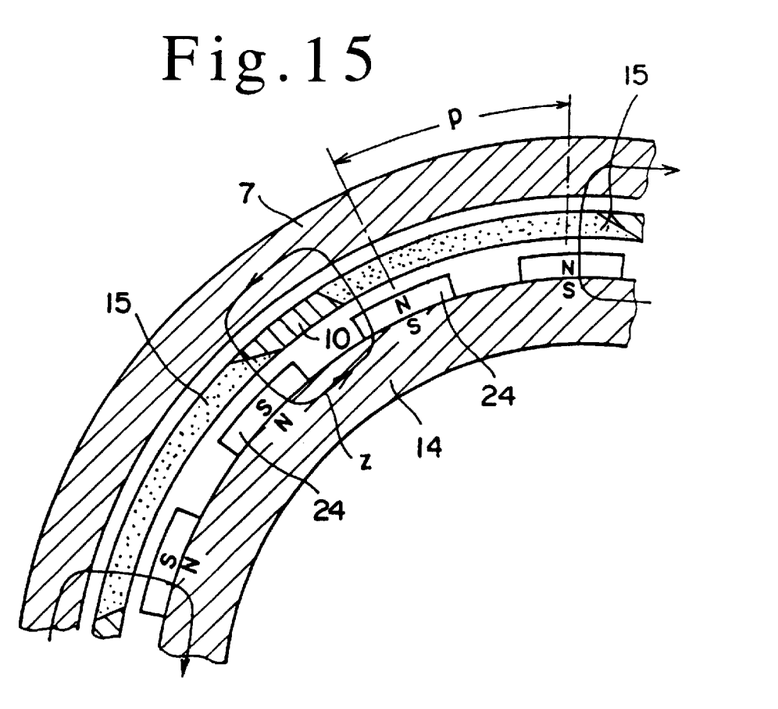
FIG. 15 is a side sectional view showing a braking state of the eddy current reduction apparatus.

In the embodiments shown in FIGS. 13 to 15, a guide tube 10 formed of a non-magnetic material and having a hollow portion in the shape of a rectangle in section is disposed interiorly of a brake drum 7 connected to a rotational shaft 1, a number of ferromagnetic pole pieces 15 are fastened at peripherally equal intervals on an outer tubular portion 10a of the guide tube 10, magnets 24 are connected to outer peripheral surfaces of a magnet support tube 14 so that the magnets 24 are opposed two by two to each ferromagnetic pole piece 15 and their polarities with respect to the ferromagnetic plate 15 are peripherally different two by two, and the magnet support tube 14 is formed of a magnetic material and is mounted for reversible rotation in the hollow portion of the guide tube 10 by a hydraulic actuator 20. An area of an outer surface 50a of each ferromagnetic pole piece 15 is made to be narrower than that of an inner surface 50b, the outer surface 50a is biased forward in a rotational direction of the brake drum 7 from the inner surface 50b, and a front surface 15a and a rear surface 15d of the ferromagnetic plate 15 are inclined forward in a rotational direction of the brake drum 7, as shown in FIGS. 3 to 12. A pair of magnets 24 of the different polarities are wholly opposed to the common ferromagnetic pole piece 15 in a non-braking position (see FIG. 14) and a pair of magnets 24 of the same polarities are wholly opposed to the common ferromagnetic pole piece 15 in a braking position (see FIG. 15).

Figure 16:
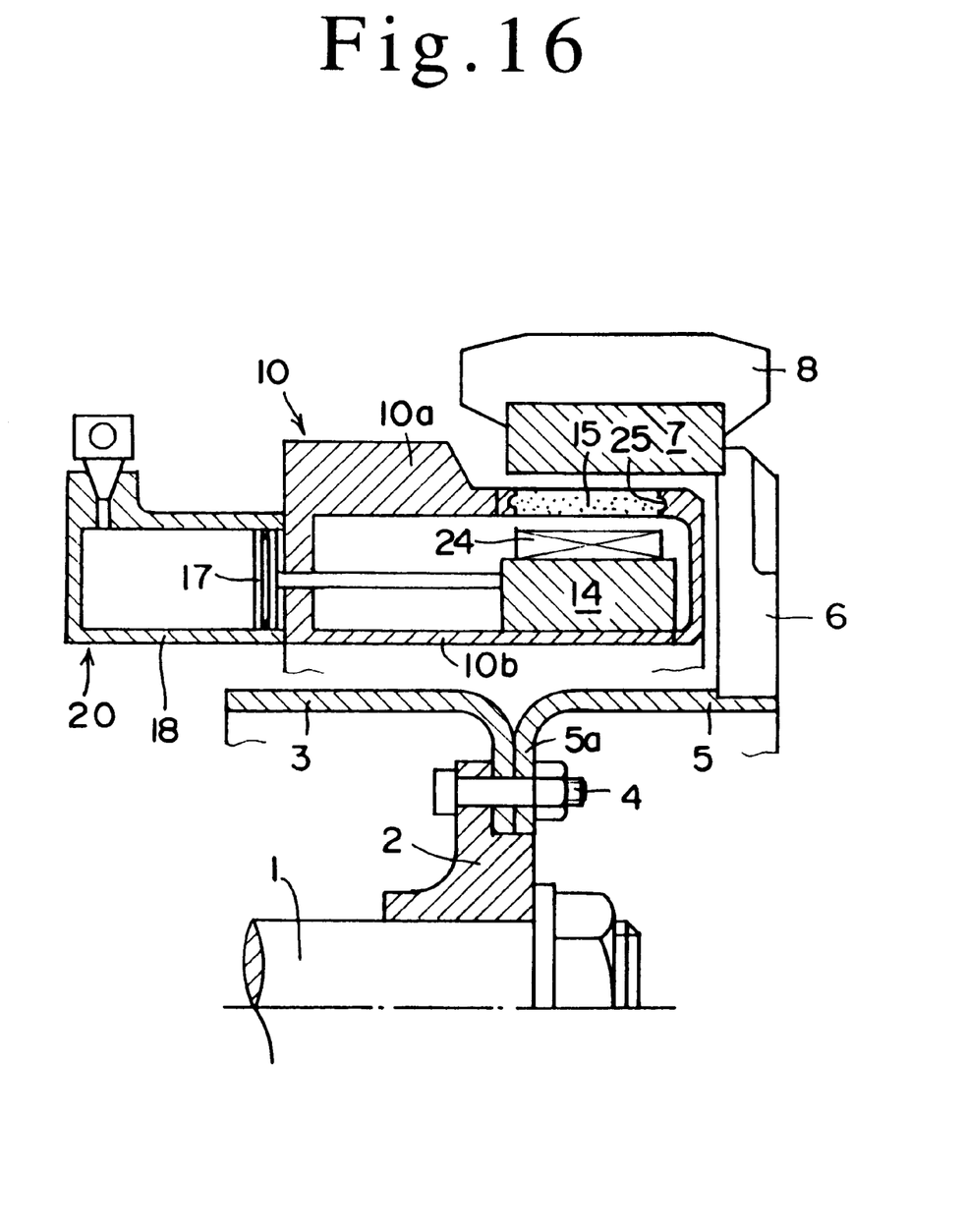
FIG. 16 is a front sectional view of another eddy current reduction apparatus to which the present invention is applied.

In the embodiment shown in FIG. 16, a guide tube 10 formed of a non-magnetic material and having a hollow portion in the shape of a rectangle in section is disposed interiorly of a brake drum 7 connected to a rotational shaft 1, a number of ferromagnetic plates 15 are disposed at peripherally equal intervals on an outer tubular portion 10a of the guide tube 10, magnets 24 are connected to the outer surfaces of a movable magnet support tube 14 formed of a magnetic material disposed axially movably in the hollow portion of the guide tube 10 so that their polarities with respect to the ferromagnetic plates 15 are peripherally, alternately different. An area of an outer surface 50a of the ferromagnetic plate 15 is made to be narrower than that of an inner surface 50b, the outer surface 50a is biased forward in a rotational direction of the brake drum 7 from the inner surface 50b, and a front surface 15a and a rear surface 15d of the ferromagnetic plate 15 are inclined forward in a rotational direction of the brake drum 7, as shown in FIGS. 3 to 12. When the movable magnet support tube 14 is protruded into the brake drum 7 by a hydraulic actuator 20 to a braking position the magnets 24 are wholly opposed to the ferromagnetic plates 15 as shown in FIG. 2, and when the magnet support tube 14 is axially moved away from the brake drum 7 to a non-braking position, the magnets 24 are not opposed to the ferromagnetic plates 15.

Obviously, many modifications and variations of the present invention are possible in light of the above teachings. It is to be understood, therefore, that the invention can be practiced otherwise than as specifically described.

What is claimed is:

1. A vehicle braking system comprising:
   a rotatable brake drum coupled to a rotary shaft and rotatable in a given direction, said brake drum defining an annular inner drum surface;
   magnet support means disposed within said brake drum;
   a plurality of annularly spaced apart permanent magnets retained by said magnet support means and facing said inner drum surfaces;
   pole piece support means disposed between said brake drum and said magnet support means;
   a plurality of annularly spaced apart ferromagnetic pole pieces retained by said pole piece support means, each said pole piece having an outer pole piece surface facing said inner drum surface and an oppositely directed inner pole piece surface facing said magnet support means, said inner pole piece surface having an area larger than the area of said outer pole piece surface and said inner pole piece surface comprising a surface portion circumferentially displaced from said outer pole piece surface in an opposite direction to said given direction; and
   adjustment means for producing relative movement between said pole pieces and said permanent magnets.

2. A system according to claim 1 wherein each said pole piece has a front end surface facing in said given direction and a rear end surface facing in said opposite direction, and said front end surface comprises at least a portion projecting from said inner pole piece surface in said given direction.

3. A system according to claim 2 wherein said front end surface is substantially uniformly tapered in said given direction from said inner pole piece surface to said outer pole piece surface.

4. A system according to claim 2 wherein said front end surface comprises a first portion substantially transverse to and joined with said inner pole piece surface, and a second portion tapered in said given direction from said first portion to said outer pole piece surface.

5. A system according to claim 1 wherein each said pole piece has a front end surface facing in said given direction and a rear end surface facing in said opposite direction, and said rear end surface comprises at least a portion projecting from said outer pole piece surface in said opposite direction.

6. A system according to claim 5 wherein said rear end surface is substantially uniformly tapered in said given direction from said inner pole piece surface to said outer pole piece surface.

7. A system according to claim 5 wherein said rear end surface comprises a first portion substantially transverse to and joined with said inner pole piece surface and a second concave portion extending between said first portion and said outer pole piece surface.

8. A system according to claim 5 wherein said rear end surface comprises one portion joined to said inner pole piece surface and another portion extending between said one portion and said outer pole piece surface, and said one portion is tapered from said inner pole piece surface in said opposite direction, and said another portion is tapered from said one portion to said outer pole piece surface in said given direction.

9. A system according to claim 8 wherein said rear end surface comprises a first portion substantially transverse to and joined with said inner pole piece surface and a second concave portion extending between said first portion and said outer pole piece surface.

10. A system according to claim 1 wherein each said pole piece has a front end surface facing in said given direction and a rear end surface facing in said opposite direction, and said front end surface extends substantially perpendicular between said inner pole piece surface and said outer pole piece surface.

11. A system according to claim 10 wherein said rear end surface is tapered from said inner pole piece surface to said outer pole piece surface in said given direction.

12. A system according to claim 1 wherein said pole piece support means comprises a non-magnetic tube supporting said annularly spaced apart pole pieces.

13. A system according to claim 12 wherein said tube has an outer support surface supporting said pole pieces.

14. A system according to claim 12 wherein said tube defines a plurality of annularly spaced apart slots, each retaining one of said pole pieces.

15. A system according to claim 14 wherein said tube defines an outer support surface and said outer pole piece surfaces are substantially aligned with an outer support surface.

16. A system according to claim 14 wherein said tube defines an inner support surface, and said inner pole piece surfaces are substantially aligned with said inner support surface.

17. A system according to claim 14 wherein said tube defines an inner support surface and an outer support surface, said outer pole piece surfaces project outwardly from said outer support surface, and said inner pole piece surfaces project inwardly from said inner support surface.

18. A system according to claim 14 wherein said tube defines a rib portion disposed between each of said slots.

\* \* \* \* \*